July 12, 1938.　　C. G. KRONMILLER　　2,123,283
VALVED DEVICE
Filed May 28, 1934
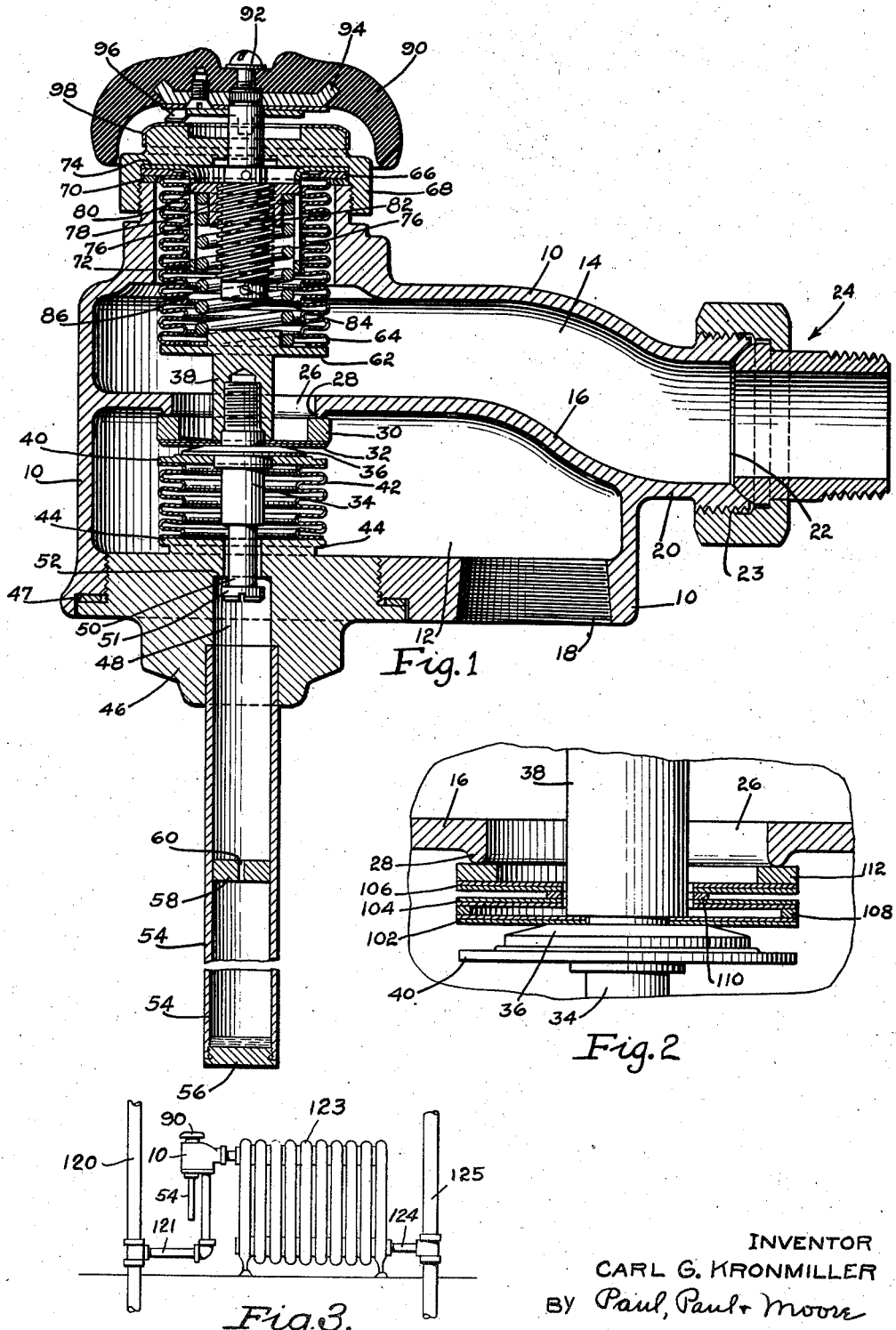
INVENTOR
CARL G. KRONMILLER
BY Paul, Paul + Moore
ATTORNEYS Patented July 12, 1938

2,123,283

UNITED STATES PATENT OFFICE 2,123,283

VALVED DEVICE

Carl G. Kronmiller, Minneapolis, Minn., assignor to Minneapolis-Honeywell Regulator Company, Minneapolis, Minn., a corporation of Delaware Application May 28, 1934, Serial No. 727,987

1 Claim. (Cl. 236—42)

This invention relates in general to valved devices, and more particularly to fluid-flow controlling valves.

A common use of such valves is to control the flow of a heated fluid to radiators which heat a space. Such valves are commonly known as "radiator valves" and are of two general types, namely: manual or hand-regulating valves and thermostatic valves.

When hand-regulating valves are used they are manually adjusted by the operator to pass the proper amount of heating fluid to the radiators to give the desired space temperature. If the heat dissipation from the space remains constant, the temperature within the space will only remain constant as long as the heat-content of the fluid flowing to the radiators remains constant. Changes in the heat-content of the fluid flowing to the radiators may result from changes in some physical condition of the fluid, such as pressure and temperature. A decrease in the pressure or temperature of steam or a decrease in the temperature of hot water decreases the heat-content per unit volume of the fluid flowing to the radiators and will result in a decrease in the radiator temperature. In addition, a decrease in the steam pressure or a decrease in the hot water temperature usually causes a decrease in fluid circulation and a corresponding decrease in the volume of fluid flowing to the radiators per unit of time, and this results in a further decrease in the radiator temperature. The heat-content of the fluid flowing to the radiators frequently fluctuates because the firing of the heating plant is usually intermittent and produces variations in the radiator temperature which results in undesirable fluctuations in the space temperature.

When thermostatic radiator valves are used they are usually equipped with temperature-sensitive elements which respond to the temperature of the space in which the radiators are located. These thermostatic radiator valves are usually of the throttling or modulating type in that the valve assumes various definite positions with respect to the valve seat as the space temperature changes. The position assumed by the valve is independent of the heat-content of the heating fluid passing through the valve to the radiator. As a result, fluctuations in the heat-content of the heating fluid have no effect on the position of the valve until the radiator either increases or decreases the space temperature, and this in turn causes the temperature-sensitive element to readjust the position of the valve. This produces unnecessary and undesirable fluctuations in the space temperature.

One of the objects of this invention is to provide a fluid-flow controlling valve which will automatically vary the flow to compensate for changes in the heat-content of the fluid.

Another object of this invention is to provide a fluid-flow controlling valve which will automatically vary the flow inversely with the temperature of the fluid.

Another object of this invention is to provide a radiator valve which will prevent fluctuations in the temperature of the heating fluid flowing to the radiator from causing fluctuations in the radiator temperature.

Another object is to provide a thermostatic valve responsive to space temperatures for controlling the amount of fluid entering the radiator with means responsive to variations in the temperature of the fluid delivered to the radiator to additionally regulate the amount of fluid entering the radiator whereby a substantially constant space temperature is maintained regardless of the temperature of the fluid.

Another object of this invention is to provide a controlling valve for a variable heat-content fluid which will automatically vary the fluid-flow to deliver a substantially constant amount of heat.

Another object of this invention is to provide a thermostatically regulated fluid-flow controlling valve with additional regulating means responsive to a physical condition of the fluid passing through the valve.

Another object of this invention is to provide an improved thermostatic fluid-flow controlling valve.

Other objects and advantages reside in certain novel features of the construction, arrangement, and combination of the parts which will be hereinafter more fully described and particularly pointed out in the appended claim, reference being had to the accompanying drawing forming a part of this specification and in which:

Fig. 1 is a central vertical section through a thermostatic radiator valve incorporating my improvement.

Fig. 2 is an enlarged sectional view of a modification of my improvement.

Fig. 3 is a diagrammatic view showing my valve as applied to a radiator.

In the drawing there has been disclosed a preferred form of the invention for the purpose of explanation and description. In the specific form shown, a valve body or casing 10 has a fluid inlet chamber 12 and a fluid outlet chamber 14 separated by a partition 16. The casing 10 may be made of various materials but is here shown as a metal casting. The casing 10 has a threaded fluid inlet opening 18 into the chamber 12 and into which may be screwed a fluid supply pipe (not shown). The casing 10 also has a neck portion 20 projecting from the outlet chamber 14 providing a fluid outlet opening 22 and having external threads 23 to which may be attached an ordinary pipe union 24. This pipe union 24 may be connected to a fluid outlet pipe or radiator.

The partition 16 has an opening 26 through which a heating fluid may pass from the inlet chamber 12 to the outlet chamber 14. There is a raised portion or valve seat 28 on the partition 16 around the edge of the opening 26 which cooperates with a movable valve 30 here shown in the form of a ring to regulate the amount of fluid passing through the opening 26.

The position of this valve 30 is controlled or regulated by three different means, two of which are external and one internal. Of the external, one is automatically responsive to an external physical condition, and the other is manually operable. The internal is automatically responsive to an internal physical condition and additionally regulates the valve position. The latter will be described first. The valve 30 is supported upon a member which responds to some physical condition, preferably a temperature condition of the passing fluid to regulate additionally the amount of fluid passing through the casing 10. This supporting member is located in the inlet chamber 12 and in contact with the fluid passing through the casing 10 and may take various forms but is here shown in the form of a thermostatic disc 32 which is preferably made of bimetal which is well-known in the art. The lower side of the thermostatic disc 32 has the greater temperature coefficient of expansion in order that it may additionally regulate the fluid-flow through the casing 10 inversely with the temperature of the fluid. Since changes in the heat-content of a fluid may be indicated by changes in some physical condition of the fluid such as pressure or temperature, the thermostatic disc 32, which responds to temperature changes, compensates for changes in the temperature or heat-content of the passing fluid. If the passing fluid is used to heat a radiator and it is desired to maintain the radiator at a constant temperature, it is necessary to deliver a constant amount of heat to the radiator, and this can only be done by varying the amount of passing fluid inversely with the heat-content of the fluid.

The thermostatic disc 32 has an opening through its center to permit it to be slipped over the upper end of a stud 34. It is then clamped against a shoulder 36 on the stud 34 by screwing a connecting member 38 on the upper end of the stud 34. The stud 34 and the member 38 actuate the valve 30 through the disc 32 to vary the position of the valve 30 with respect to the partition 16 and regulate the flow of a heating fluid through the casing 10. For any position of the stud 34 and the member 38 the thermostatic disc 32 may vary the position of the valve 30 to regulate additionally the flow of the fluid through the casing 10.

The valve-regulation automatically responsive to an external physical condition is here disclosed as a thermostatic mechanism responsive to space temperature. The stud 34 and member 38 are operated thereby. On the under side of the shoulder 36 there is secured a flange 40 to which is attached the upper end of a bellows 42. The lower end of the bellows 42 is attached to a boss 44 on a large plug 46 which is screwed into the lower part of the casing 10. A packing member 47 is inserted between the plug 46 and the casing 10. The large plug 46 has an opening 48 through its center and connecting with the inside of the bellows 42. The lower end of the stud 34 has an internally threaded opening to receive a screw 50. The screw 50 has an enlarged head 51 which cooperates with a shoulder 52 in the opening 48 to prevent the bellows 42 from expanding beyond a fixed amount before the plug 46 is screwed into the casing 10. A metal tube 54 has its upper end soldered into the opening 48. The lower end of the tube 54 is equipped with a plug 56. The tube 54 is also equipped with a close-fitting plug 58 having a small opening 60 therethrough. The tube 54 and bellows 42 are filled with a volatile fluid which may expand and contract the bellows 42 upon changes in some physical condition external of the casing 10, such as the temperature of the air surrounding the lower end of the tube 54. The plug 58 in the tube 54 helps to separate the heavier part of the volatile fluid in the bottom of the tube 54 from the lighter or rarefied part in the bellows 42. By this arrangement, the expansion and contraction of the bellows 42 and accordingly the position of the valve 30 are governed by the temperature of the air surrounding the lower part of the tube 54 even though this air temperature may be only about 70° F. and the temperature of the fluid passing through the casing 10 and in contact with the bellows 42 may be considerably above 200° F. This arrangement provides external thermostatic operating means for the stud 34 which actuates the valve 30 to vary the amount of a heating fluid passing through the casing 10 in accordance with the heat requirements.

The externally manually operable regulation of the valve 30 will next be described. The upper end of the member 38 is equipped with a flange 62. The upper face of the flange 62 has the lower end of a bellows 64 sealed thereto. The upper end of the bellows 64 is attached to a ring 66 which is clamped to the casing 10 by a nut 68. There is a packing member 70 between the ring 66 and the casing 10. A sleeve 72 projects downwardly inside of the bellows 64 and has a flange 74 at the top overlying the ring 66. By means of this flange 74, the sleeve 72 is securely clamped in place along with the bellows ring 66 by the nut 68. This sleeve 72 is equipped with two vertical slots 76. A nut 78 which is on the inside of the sleeve 72 has ears 80 projecting into the slots 76. The ears 80 cooperate with the slots 76 to prevent the nut 78 from rotating while it is being operated up and down by an externally threaded stud 82 which passes through the nut 78. The slots 76 also limit the travel of the nut 78. The stud 82 is equipped with pins 84 which prevent additional rotation of the stud 82 after the ears 80 of the nut 78 strike either the upper or lower end of the slots 76. Between the nut 78 and the flange 62, there is inserted a compression spring 86 which acts against the bellows 42. The upper unthreaded end of the stud 82 passes through the center of the nut 68 and has a manually operable handle 90 attached thereto by a screw 92. The handle 90 is preferably made of a moulded heat-insulating material having a metal insert 94. The upper end of the stud 82 cooperates with this metal insert 94 by means of a splined connection to permit the stud 82 to be turned by means of the handle 90. A spring member 96 is secured to the metal insert 94 and rests on a cup member 98 which fits over the upper part of the nut 68. By manually rotating the handle 90, the nut 78 can be made to move up and down thus changing the compression of the spring 86 which will accordingly vary the position of the valve 30 to regulate the amount of fluid flowing through the casing 10. By rotating the handle 90 in one direction and increasing the compression of the spring 86 sufficiently, the valve 30 can be made to assume an open position for any ordinary space temperature. By rotating the handle in the opposite direction and decreasing the compression of the spring 86 sufficiently, the valve 30 may be made to assume a closed position even for a relatively low space temperature. This arrangement provides external operating means for the member 38 which actuates the valve 30 and also provides external adjusting means for the bellows 42. By means of this manually operable handle 90, the valve 30 can be moved to any desired position for a particular temperature of the air surrounding the lower end of the tube 54 and for a particular temperature of the fluid passing through the casing 10.

*Method of assembly*

The bellows 42, flange 40, and the shoulder 36 of the stud 34 are assembled by soldering or by some other means that will make a good seal. The bellows 42 is then soldered to the boss 44 on the large plug 46. The screw 50 is then screwed into the stud 34. The tube 54 is then soldered into the opening 48 of the large plug 46. The plug 58 may be placed in the tube 54 before or after the tube is soldered in the large plug 46. The proper amount of a volatile fluid is then inserted into the tube 54 after which the plug 56 is screwed into the end of the tube 54. The seam between the plug 56 and the tube 54 is then filled with solder. The amount and kind of volatile fluid used will depend upon the purpose for which the device is to be used, and such fluids are well known in the art. The thermostatic disc 32, which has the valve 30 soldered thereon, is then slipped over the end of the stud 34, and the large plug 46 is screwed into the casing 10. The packing 47 makes this a tight joint when the plug 46 is properly screwed into place. The bellows 64, ring 66, and the flange 62 of the member 38 are all soldered together. The member 38 is screwed to the upper end of the stud 34 by turning the ring 66 to clamp the thermostatic disc 32 securely in place. The spring 86 is then placed inside the bellows 64. The nut 66, sleeve 72, nut 78, and threaded stud 82 are made up as a sub-assembly which is then dropped into place and the nut 68 screwed to the casing 10 to clamp the ring 66, flange 74, and packing 70 against the casing 10. The handle 90 can be attached later by means of the screw 92.

*Operation*

A valved device such as the one here described may be installed on a steam radiator which is being used to heat a space, and its operation will be described in connection with such a radiator. Referring to Fig. 3, saturated steam is delivered to risers 120 from some boiler (not shown). Connected to the riser 120 is a pipe 121 which in turn connects into the radiator valve 10. The radiator valve 10 is in turn connected to the radiator 123 in such a manner that the delivery of steam to the radiator 123 is controlled by the radiator valve 10. Condensed steam is taken from the radiator 123 by means of a pipe 124 connected into a return riser 125 which leads back to the boiler not shown in a manner usual in the art. The steam for the radiator enters the chamber 12 through the opening 18 and then passes through the opening 26 into the chamber 14 which is connected with the radiator by means of the opening 22. By turning the handle 90, the valve 30 can be made to assume any desired position for a particular temperature of the air surrounding the lower end of the tube 54. The valve 30 will then be moved up and down automatically in accordance with the temperature of the air surrounding the lower end of the tube 54. Under such conditions, if the heat-content of the fluid flowing to the radiator should decrease as indicated by a decrease in steam pressure, the temperature of the steam entering the radiator will decrease accordingly. The lower steam temperature will cause the radiator to cool and in turn cool the air surrounding the lower end of the tube 54. When this occurs, the bellows 42 will contract and thereby move valve 30 to a wider open position to admit more of this low temperature steam to the radiator. This causes unnecessary and undesirable fluctuations in the space temperature, and thermostatic radiator valves operating in this general manner are old in the art.

The additional regulating means here provided eliminates such fluctuations. Such additional means can automatically and immediately vary the amount of fluid flowing to the radiator inversely with the heat-content of the fluid to compensate for changes in the amount of heat being delivered to the radiator. When the steam pressure decreases as above explained, the lower steam temperature immediately causes the thermostatic disc 32 to move the valve 30 to a wider open position and thus automatically and immediately pass more of the low temperature steam to the radiator to compensate for the decrease in the heat-content of the steam flowing to the radiator. This decrease in steam pressure would ordinarily result in a decrease in fluid circulation and would therefore tend to decrease the radiator temperature further, but the compensation provided by the thermostatic disc 32 is sufficient to compensate for the decrease in both the heat-content and the circulation. An increase in steam pressure above normal will accordingly cause the thermostatic disc 32 to move the valve 30 to a more nearly closed position to compensate for the increase in the heat-content of the fluid flowing to the radiator and for the increased circulation. In a valved device of this construction, the opening 26 through the partition 16 is made large in comparison with the opening in an ordinary valve of the same size. This is done to enable the maximum required fluid-flow to take place by moving the valve 30 only a few thousandths of an inch from the valve seat 28. By this arrangement, the valve 30 will move to vary the fluid-flow from minimum to maximum with only a small temperature change at the lower end of the tube 54, and the thermostatic disc 32 can move the valve 30 sufficiently to compensate for changes in the heat-content of the fluid even though this movement is only a few thousandths of an inch.

In the modification shown in Fig. 2, corresponding parts carry the same number as in Fig. 1. In this modification, the thermostatic disc 32 and the valve 30 of Fig. 1 are replaced with a compound thermostatic assembly consisting of thermostatic or bimetal elements in the form of thermostatic discs 102, 104, and 106. The thermostatic discs 102 and 104 are both soldered to a ring 108 at their outer edges. The thermostatic discs 104 and 106 are both soldered to a ring 110 at their inner edges. A valve 112 in the form of a ring is soldered to the upper outside edge of the thermostatic disc 106. This valve 112 cooperates with the valve seat 28 in the same manner that valve 30 cooperates with the valve seat 28 in Fig. 1. This compound thermostatic valve assembly is clamped to the shoulder 36 of the stud 34 by screwing the member 38 down on the top of the stud 34. The openings in the thermostatic discs 104 and 106 are large enough to clear the member 38. The bimetallic thermostatic discs 102, 104, and 106 all have their more active portions on the lower side in order that they may function in the same manner as thermostatic disc 32 of Fig. 1. This compound thermostatic disc assembly can be used when it is desired to amplify the valve movement and thus give greater compensation than can be obtained with the single thermostatic disc 32 shown in Fig. 1.

Various other modifications and combinations of thermostatic elements may be used to replace the thermostatic disc 32. Volatile-filled bellows, as well as devices responsive to the pressure of the steam passing through the valve, may also be used to accomplish the same result as accomplished by the thermostatic disc 32.

This improvement may be applied to various types of valved devices and has utility in the heating, refrigerating, processing, and manufacturing fields wherever it is desired to have the device additionally vary the fluid-flow in accordance with some physical condition of the passing fluid.

While but two specific embodiments of the invention are herein shown and described, it is to be understood that various modifications thereof will be apparent to those skilled in the art without departing from the spirit and scope of the invention set forth in the following claim.

Having thus described my invention, what I claim as new and desire to secure by United States Letters Patent is:

An automatic valve for controlling the flow of heating medium into a heating element for heating a space comprising, in combination, a valve casing having inlet and outlet passages separated by a partition having a valve port therein, a valve member cooperating with said valve port for controlling the flow of said temperature changing fluid from said inlet passage to said outlet passage, a thermostatic motor means responsive solely to space temperature connected to said valve member and arranged for graduatingly moving said valve member towards closed position upon an increase in said space temperature and for graduatingly moving said valve member towards open position upon decrease in said space temperature, and means for compensating for the effect of changes in heat content of the heating medium upon the operation of said heating element, said compensating means comprising a second thermostatic motor means, said second thermostatic motor means being arranged within said valve casing to be responsive solely to the temperature of the heating medium flowing through the valve and interposed between said first thermostatic means and said valve member for varying the relationship between said first thermostatic motor means and said valve member, said second thermostatic motor means being arranged to graduatingly move said valve towards closed position upon increase in temperature of the heating medium and to graduatingly move said valve towards open position upon decrease in temperature of the heating medium to maintain a substantially constant heat output by said heating element for a given space temperature.

CARL G. KRONMILLER.